US012726571B2

(12) United States Patent
Gupta et al.

(10) Patent No.: US 12,726,571 B2
(45) Date of Patent: Sep. 1, 2026

(54) CONTACT CENTER DEFLECTION SYSTEM

(71) Applicant: State Farm Mutual Automobile Insurance Company, Bloomington, IL (US)

(72) Inventors: Amit Kumar Gupta, Normal, IL (US); Bhanu Cattamanchi, Suwanee, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 118 days.

(21) Appl. No.: 18/935,246

(22) Filed: Nov. 1, 2024

(65) Prior Publication Data

US 2025/0193311 A1 Jun. 12, 2025

Related U.S. Application Data

(60) Provisional application No. 63/608,688, filed on Dec. 11, 2023.

(51) Int. Cl.
*H04M 3/51* (2006.01)
*H04M 3/08* (2006.01)
*H04M 3/523* (2006.01)

(52) U.S. Cl.
CPC ........... *H04M 3/5175* (2013.01); *H04M 3/08* (2013.01); *H04M 3/523* (2013.01); *H04M 2203/403* (2013.01)

(58) Field of Classification Search
CPC ...... H04M 3/5175; H04M 3/08; H04M 3/523; H04M 2203/403; H04M 3/51
See application file for complete search history.

(56) References Cited

U.S. PATENT DOCUMENTS 8,411,841 B2 * 4/2013 Edwards ................ G06Q 30/02 379/265.06
9,936,066 B1 4/2018 Mammen et al.
10,127,321 B2 11/2018 Aravamudhan et al.
11,032,420 B2 6/2021 Hillier et al.
11,196,866 B1 * 12/2021 Samat .................. H04L 51/046
11,250,149 B2 2/2022 Koch et al.
2010/0088322 A1 * 4/2010 Chowdhury ...... G06F 16/90335 707/E17.014
2011/0033036 A1 * 2/2011 Edwards ................ G06Q 30/02 379/265.09

* cited by examiner

*Primary Examiner* — Yosef K Laekemariam
(74) *Attorney, Agent, or Firm* — Lee & Hayes, P.C.

(57) ABSTRACT

A deflection bot, such as a chatbot, may resolve contacts with a contact center automatically if a knowledge base includes information relevant to the contacts, and thereby deflect the contacts away from being handled by representatives of the contact center. If the deflection bot is unable to resolve contacts associated with a topic based on information in the knowledge base, the non-deflected contacts may be routed on to representatives. A dashboard associated with the contact center may identify, substantially in real-time, when a spike in non-deflected contacts associated with a topic occurs. A user of the dashboard may, in response to identification of the spike, add information relevant to the topic to the knowledge base, and thereby configure the deflection bot to use the added information to automatically resolve subsequent contacts about the topic.

20 Claims, 5 Drawing Sheets

CONTACT CENTER DEFLECTION SYSTEM

RELATED APPLICATIONS

This U.S. patent application claims priority to provisional U.S. Patent Application No. 63/608,688, entitled "CONTACT CENTER DEFLECTION SYSTEM," filed on Dec. 11, 2023, the entirety of which is incorporated herein by reference.

TECHNICAL FIELD

The present disclosure relates to a contact center, particularly with respect to systems configured to automatically handle contacts and thereby deflect the contacts away from being handled manually by representatives of the contact center.

BACKGROUND

Callers or other individuals may engage in contacts with a contact center. The contacts may include calls, chat sessions, email exchanges, text messages, and/or other types of communications. The contact center may be associated with a business or other entity, and may have representatives and/or other systems that may communicate with callers during contacts.

For example, representatives of the contact center may manually handle contacts by answering questions for callers or by assisting callers with other issues. However, in some contact centers, computer-based systems may be configured to at least initially attempt to assist callers during contacts automatically, without the involvement of human representatives. If such computer-based systems are unable to resolve certain contacts automatically, those contacts may be routed to representatives so that the representatives may manually handle the contacts.

In some situations, the amount of contacts that computer-based systems are unable to resolve automatically may increase quickly over a relatively short period of time, for instance in response to external events or other issues that the computer-based systems have not yet been configured to address. Accordingly, in such situations, the amount of contacts that are routed to representatives, and are to be handled manually by the representatives, may also increase quickly.

The example systems and methods described herein may be directed toward mitigating or overcoming one or more of the deficiencies described above.

SUMMARY

Described herein are systems and methods by which a deflection bot, such as a chatbot, associated with a contact center may communicate with callers during contacts automatically based on information stored in a knowledge base. If the knowledge base does not have information relevant to a particular topic, the deflection bot may be unable to automatically resolve contacts associated with that particular topic, and those contacts may be routed to representatives of the contact center. A topic dashboard associated with the contact center may identify, in real-time or near real-time, when a spike in non-deflected contacts associated with a topic occurs. In response to identification of such a spike in non-deflected contacts associated with a topic via the topic dashboard, a user of the topic dashboard may add new information relevant to the topic to the knowledge base. The deflection bot may therefore become configured to use the newly added information in the knowledge base to resolve subsequent contacts with callers about the topic. Accordingly, the deflection bot may become more likely to successfully deflect contacts about the topic away from representatives based on the information added to the knowledge base, and the likelihood of such contacts about the topic being routed to representatives may decrease.

According to a first aspect, a computer-implemented method includes identifying, by a computing system including a processor, contacts with a contact center that are associated with a topic, where a deflection bot is configured to automatically handle at least an initial portion of the contacts. The computer-implemented method also includes determining, by the computing system, a non-deflection count indicating a number of the contacts, over a period of time, that the deflection bot was unable to resolve based on a knowledge base and that were routed from the deflection bot to representatives. The computer-implemented method additionally includes causing, by the computing system, display of a user interface indicating a spike in the non-deflection count over the period of time. The computer-implemented method further includes receiving, by the computing system, and in response to the spike in the non-deflection count indicated by the user interface, new information associated with the topic. The computer-implemented method also includes configuring, by the computing system, the deflection bot to handle subsequent contacts associated with the topic by adding the new information to the knowledge base.

According to a second aspect, a computing system includes one or more processors and memory storing computer-executable instructions associated with a contact center system. The computer-executable instructions, when executed by the one or more processors, cause the one or more processors to determine a non-deflection count indicating a number of contacts, between callers and a contact center, that are associated with a topic and that over a period of time have been handled by representatives of the contact center instead of being resolved automatically by a deflection bot based on a knowledge base. The computer-executable instructions also cause the one or more processors to cause display of a dashboard indicating a spike in the non-deflection count over the period of time. The computer-executable instructions additionally cause the one or more processors to receive, based on the spike in the non-deflection count, user input defining information associated with the topic. The computer-executable instructions further cause the one or more processors to configure the deflection bot to handle subsequent contacts associated with the topic by adding the information associated with the topic, defined by the user input, to the knowledge base.

According to a third aspect, one or more non-transitory computer-readable media store computer-executable instructions associated with a contact center system. The computer-executable instructions, when executed by the one or more processors, cause the one or more processors to determine a non-deflection count indicating a number of contacts, between callers and a contact center, that are associated with a topic and that over a period of time have been handled by representatives of the contact center instead of being automatically resolved by a deflection bot based on a knowledge base. The computer-executable instructions also cause the one or more processors to cause display of a dashboard indicating a spike in the non-deflection count over the period of time. The computer-executable instructions additionally cause the one or more processors to receive, based on the spike in the non-deflection count, user input defining information associated with the topic. The computer-executable instructions further cause the one or more processors to configure the deflection bot to handle subsequent contacts associated with the topic by adding the information associated with the topic, defined by the user input, to the knowledge base.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
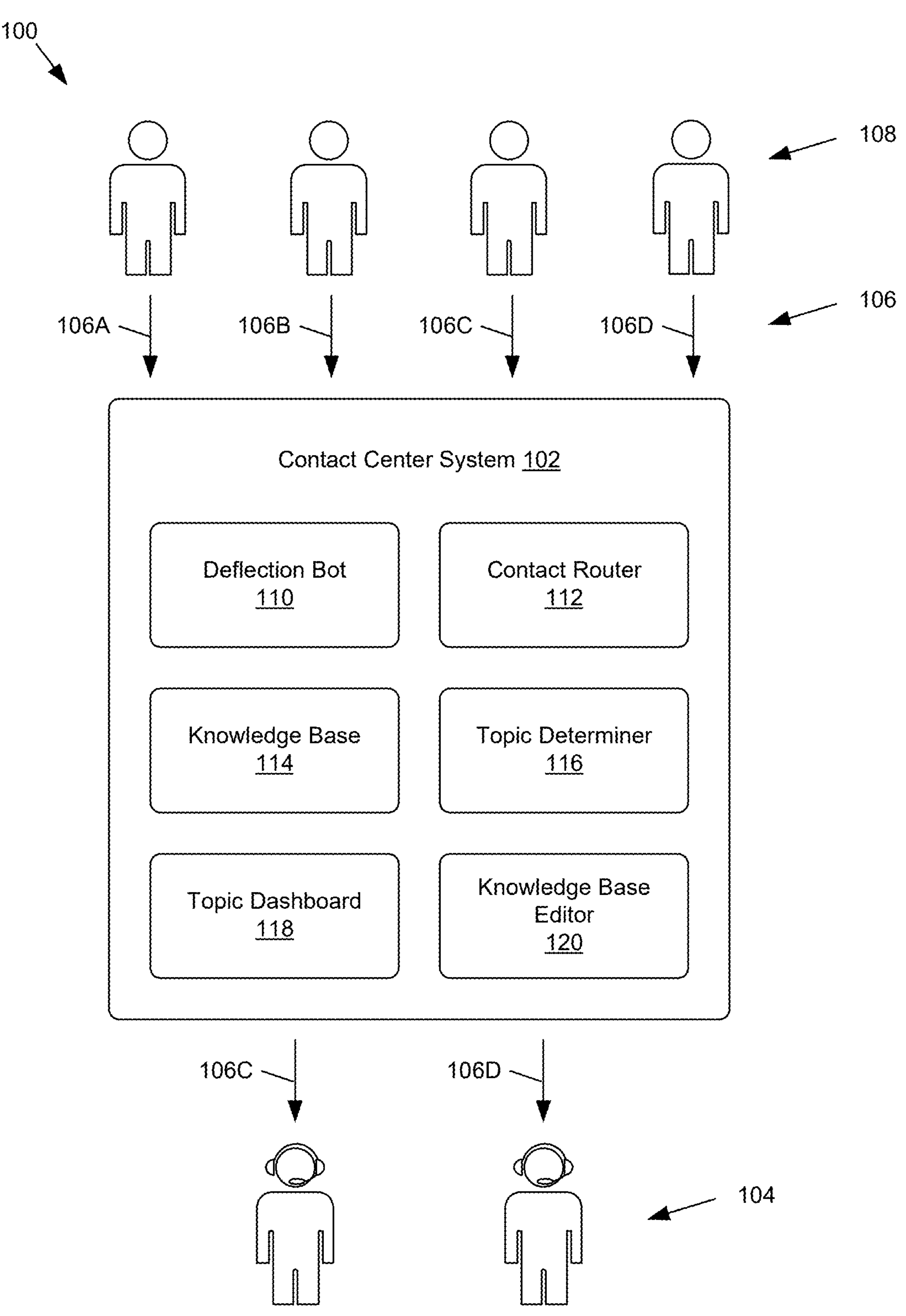
FIG. 1 shows an example of a contact center system associated with a contact center.

FIG. 1 shows an example 100 of a contact center system 102 associated with a contact center. The contact center may be associated with an entity, such as a business or other organization. The contact center may be staffed with representatives 104 who may engage in contacts 106 with callers 108. The contact center system 102 may also have a deflection bot 110, such as a chatbot, that may automatically engage in contacts 106 with callers 108, instead of or in addition to contacts 106 being handled manually by representatives 104. Contacts 106 between callers 108 and representatives 104 and/or the deflection bot 110 may include voice calls, video calls, emails, chat sessions, text messages, and/or other types of communications.

The callers 108 may be customers, or other individuals or entities, who may have questions or other issues that may be addressed via contacts 106 with the contact center. Accordingly, although the term "caller" is used herein to refer to an individual or entity that engages in a contact 106 with the contact center, a caller 108 may use a text-based contact 106, a video-based contact 106, or other type of contact 106 instead of, or in addition to, an audio call or other audio-based contact 106 to communicate with the contact center.

The contact center system 102 may have a contact router 112 that is configured to route contacts 106 to representatives 104 and/or to the deflection bot 110. Representatives 104 at the contact center may manually handle contacts 106 with callers 108. For example, a human representative 104 may engage in an audio call, or other type of contact 106, with a caller 108. Representatives 104 may attempt to manually resolve contacts 106 by answering questions for caller 108 and/or taking other actions to resolve issues for callers 108.

However, the contact router 112 may be configured to at least initially route incoming contacts 106 to the deflection bot 110. The deflection bot 110 may be a chatbot or other computer-implemented system that is configured to automatically handle at least an initial portion of individual contacts 106, without manual involvement of the representatives 104, based on information stored in a knowledge base 114. For example, the deflection bot 110 may answer a question posed by a caller 108 during a contact 106 by providing information, relevant to the caller's question, that is stored in the knowledge base 114 and/or is derived from information stored in the knowledge base 114.

The knowledge base 114 may include one or more databases or other repositories of information. The knowledge base 114 may store information, such as articles, predefined answers, historical information, and/or other data, associated with corresponding topics that may be relevant to contacts 106. As an example, if the contact center is associated with a technical support helpline for a company's products, the knowledge base 114 may include articles that describe known problems with products, and/or that describe recommended solutions to those problems. As another example, if the contact center is associated with a company's information technology (IT) department, the knowledge base 114 may include articles that describe known IT issues associated with software and/or other technology used within the company that employees of the company may experience, and/or that describe solutions to such IT issues.

If the knowledge base 114 stores information relevant to a topic of a contact 106 being handled by the deflection bot 110, the deflection bot 110 may present that relevant information to a caller 108 as described further below. In some situations, information from the knowledge base 114 that the deflection bot 110 presents to a caller 108 during a contact 106 may be sufficient to answer a question posed by the caller 108 or otherwise resolve an issue for the caller 108, such that the contact 106 may be fully resolved automatically by the deflection bot 110.

If the deflection bot 110 is unable to resolve a contact 106 based on information in the knowledge base 114, the contact router 112 may route the contact 106 to a representative 104 so that the representative 104 may manually handle the contact 106. However, if the deflection bot 110 is able to fully resolve a contact 106 based on information in the knowledge base 114, the contact 106 may be concluded without the contact router 112 routing the contact 106 to a representative 104 and without the contact 106 being manually handled by a representative 104. Contacts 106 resolved by the deflection bot 110 may accordingly be deflected away from the representatives 104, thereby reducing the overall amount of contacts 106 that are handled manually by the representatives 104 of the contact center.

As a non-limiting example, a set of callers 108 may initiate four contacts 106 with the contact center, such as contact 106A, contact 106B, contact 106C, and contact 106D as shown in FIG. 1. The deflection bot 110 may automatically resolve contact 106A and contact 106B based on information stored in the knowledge base 114, but may be unable to automatically resolve contact 106C and contact 106D based on information stored in the knowledge base 114. Contact 106A and contact 106B may therefore be resolved automatically by the deflection bot 110 without being routed to representatives 104, while the contact router 112 may route contact 106C and contact 106D to representatives 104. In this example, the deflection bot 110 deflects contact 106A and contact 106B away from the representatives 104, and thereby halves the number of contacts 106 that are routed to, and are manually handled by, the representatives 104.

The deflection bot 110 may be a computer-implemented chatbot or other computer-implemented system that is configured to interact with callers 108 in association with contacts 106. The deflection bot 110 may also be configured to use information stored in the knowledge base 114 to attempt to resolve the contacts 106, such that the contacts 106 may be concluded without the contact router 112 routing the contacts 106 on to representatives 104. For instance, when a new incoming contact 106 from a caller 108 is made to the contact center, the contact router 112 and/or other elements of the contact center system 102 may cause the deflection bot 110 to communicate with the caller 108 in association with the new incoming contact 106.

The deflection bot 110 may communicate with a caller 108 via text, audio, and/or other types of media. For example, if a contact 106 with a caller 108 is a telephone call or other audio-based contact 106, the deflection bot 110 may use voice-to-text systems, natural language processing (NLP), and/or other types of audio processing to interpret audio data associated with statements, questions, or other input from the caller 108 during the contact 106. The deflection bot 110 may also use such systems to generate audio output that may be presented to the caller 108 during the contact 106. Accordingly, in this example, the caller 108 may have a voice-based audio conversation with the deflection bot 110 during the contact 106.

As another example, if a contact 106 with a caller 108 is a text-based chat session or other text-based contact 106, the deflection bot 110 may similarly use NLP and/or other types of text processing systems to interpret text input provided by the caller 108 during the contact 106, and/or generate text output that may be presented to the caller 108 during the contact 106. Accordingly, in this example, the caller 108 may have a text-based conversation with the deflection bot 110 during the contact 106.

In some examples, the deflection bot 110 may be programmed with predefined questions, predefined scripts, predefined rules, and/or other predefined configuration data that causes the deflection bot 110 to interact with callers 108 in predetermined ways. For example, the deflection bot 110 may be configured to communicate with callers 108 based on a predefined decision tree, for instance by asking predefined questions or making predefined statements to the caller 108, receiving responses from the caller 108, and moving down the predefined decision tree to ask other questions or make other predetermined statements based on the responses received from the caller 108.

However, in other examples, the deflection bot 110 may be based on machine learning (ML) and/or artificial intelligence (AI) systems, such that the deflection bot 110 may dynamically determine and/or generate output to present to callers 108, and/or dynamically interpret input from callers 108, without following predefined decision trees or other predefined rules. For example, the deflection bot 110 may be based on convolutional neural networks, recurrent neural networks, other types of neural networks, nearest-neighbor algorithms, regression analysis, deep learning algorithms, Gradient Boosted Machines (GBMs), Random Forest algorithms, and/or other types of artificial intelligence or machine learning frameworks.

In these examples, one or more machine learning models associated with the deflection bot 110 may be trained on a training data set via using supervised machine learning and/or unsupervised machine learning. The training data set may, for example, include historical data indicating how representatives 104 and/or prior versions of the deflection bot 110 have interacted with callers 108 during a set of historical contacts 106, and thereby indicate which types of statements or questions did or did not successfully lead to resolutions of the historical contacts 106. The deflection bot 110 may accordingly be trained to dynamically determine which statements or questions to express during contacts 106 with callers 108, for instance based on making predictions of which statements or questions are most likely to lead to resolution of the contacts 106, instead of or in addition to using predefined scripts or other predefined rules to determine which statements or questions to express during contacts 106.

The deflection bot 110 may, in some examples, be based on a generative AI and/or ML model. Such a generative AI and/or ML model may, during contacts 106, dynamically interpret input from callers 108, the knowledge base 114, and/or other sources. Such a generative AI and/or ML model may also, or alternately, dynamically generate natural language output proactively, and/or in response to input received from callers 108, the knowledge base 114, and/or other sources. As an example, the deflection bot 110 may be based on a large language model and/or a generative pre-trained transformer (GPT) model, similar to other GPT-based models such as ChatGPT®. Accordingly, the deflection bot 110 may be trained to, during a contact 106, dynamically interpret input from a caller 108 and to dynamically generate conversational statements, questions, and/or other output proactively and/or in response to the input from the caller 108, instead of or in addition to selecting or presenting predefined statements, questions, and/or other output.

One or more models associated with the deflection bot 110 may be trained using supervised learning, reinforcement learning, and/or other machine learning techniques. For example, a model training system may train the deflection bot 110 based upon supervised learning using labeled training data associated with historical contacts, such that the training causes the deflection bot 110 to predict which labeled data is responsive to example user questions. During training of the deflection bot 110, the deflection bot 110 may also dynamically generate example output in response to example user questions. Corresponding manual feedback may be collected from humans in association with the example output. For instance, the manual feedback may indicate whether or not the humans subjectively believed that the example output generated by the deflection bot 110 expressed accurate and relevant information, sufficiently responded to the example user questions, and/or was readable or understandable by humans. Feedback provided during such manual review may be used, for instance via Reinforcement Learning from Human Feedback (RLHF) techniques, to further train or retrain the deflection bot 110.

After the deflection bot 110 has been trained, the deflection bot 110 may be deployed in the contact center system 102, such that deflection bot 110 may automatically handle contacts 106 by dynamically interpreting input from callers 108, and/or by dynamically generating output proactively and/or in response to the input from callers 108. Statements and other output generated and/or expressed by the deflection bot 110 during such contacts may be based upon information that was in the training dataset when the deflection bot 110 was trained, and/or may be based on other information that is accessible by the deflection bot 110.

For example, information in the knowledge base 114 may be used to train the deflection bot 110, and/or the deflection bot 110 may access information in the knowledge base 114 that was not used to train the deflection bot 110. As described further below, information may be added to the knowledge base 114 over time, such that the deflection bot 110 may use new information added to the knowledge base 114 during contacts 106 with callers 108. Accordingly, during contacts 106 the deflection bot 110 may present information stored in the knowledge base 114 to callers 108, and/or dynamically generate output for callers 108 that is derived from, summarizes, or is otherwise based on information stored in the knowledge base 114.

When the deflection bot 110 handles a contact 106, the deflection bot 110 may receive information from the caller 108 that indicates a topic of the contact 106. In some examples, the deflection bot 110 may use one or more predefined questions, or dynamically generate one or more questions, that prompt the caller 108 provide input explaining why the caller 108 is contacting the contact center, and that thereby indicates a topic of the contact 106. In other examples, the caller 108 may proactively provide input to the deflection bot 110 explaining why the caller 108 is contacting the contact center and that indicates the topic of the contact 106. For instance, input provided by the caller 108 proactively and/or in response to one or more questions from the deflection bot 110 may indicate a problem or other issue that the caller 108 is experiencing, a question the caller 108 would like answered, or any other information associated with a topic of the contact 106.

If the knowledge base 114 stores information relevant to the topic of the contact 106, the deflection bot 110 may use the knowledge base 114 to present that relevant information to the caller 108. In some examples, the deflection bot 110 may present information relevant to the topic by sharing a link, such as a selectable Internet link, to a corresponding article within the knowledge base 114. In other examples, the deflection bot 110 may copy all or a portion of an article in the knowledge base 114 that is relevant to a topic of the contact 106, and present the copied content to the caller 108 via audio and/or text output. In examples in which the deflection bot 110 is based on a generative AI/ML model and/or a large language model, such as if the deflection bot 110 is a chatbot based on a GPT model or another generative model, the deflection bot 110 may dynamically generate output that summarizes and/or rephrases information stored in the knowledge base 114 that is relevant to the topic of a contact 106, and may present the dynamically-generated output to a caller 108 during the contact 106.

The contact center system 102 may have, or be linked with, a topic determiner 116 that is configured to monitor contacts 106 handled by the deflection bot 110 and/or representatives 104, and to determine the topics of those contacts 106. For example, audio data, text data, transcripts of audio data, and/or other types of data indicative of words and phrases used by callers 108, representatives 104, and/or the deflection bot 110 may be provided to the topic determiner 116 so that the topic determiner 116 may determine the topics of the contacts 106.

The topic determiner 116 may use NLP, machine learning, and/or other techniques to monitor and analyze contacts 106, and to determine topics associated with the contacts 106. In some examples, the topic determiner 116 may be based on Amazon® Connect Contact Lens, Amazon® Kendra, and/or other platforms or systems that are configured to monitor and analyze contacts 106.

In some examples, the deflection bot 110 may use an analysis of a contact 106 by the topic determiner 116 to determine a topic relevant to the contact 106, substantially in real-time as the contact 106 is occurring. Accordingly, the deflection bot 110 may determine if the knowledge base 114 stores any information relevant to the topic identified by the topic determiner 116.

However, in other examples the deflection bot 110 may also or alternately be configured to interpret input from a caller 108 during a contact 106, and to use that input to itself determine a corresponding topic and/or to identify corresponding relevant information stored in the knowledge base 114, instead of or in addition to using a determination of the topic of the contact 106 identified by a separate topic determiner 116. In these examples, the topic determiner 116 may be the deflection bot 110, or may be an element of the deflection bot 110. As an example, if the deflection bot 110 is a chatbot based on a GPT model or has other ML/AI elements, the deflection bot 110 may be configured to dynamically interpret input from callers 108 and/or other data to dynamically determine topics of corresponding contacts 106.

As discussed above, if the deflection bot 110 is able to fully resolve a contact 106 based on information in the knowledge base 114, the contact 106 may be concluded without the contact router 112 routing the contact 106 to a representative 104. However, if the deflection bot 110 is unable to resolve a contact 106 based on information in the knowledge base 114, the contact router 112 may route the contact 106 to a representative 104 so that the representative 104 may manually handle the contact 106. The topic determiner 116 may evaluate contacts 106, handled by the deflection bot 110 and/or representatives 104, to determine corresponding topics of the contacts 106 substantially in real-time during the contacts 106 and/or after conclusions of the contacts 106, such that topics of contacts 106 the deflection bot 110 was unable to resolve and that are routed to representatives 104 may be identified.

The contact center system 102 may have, or be associated with, a topic dashboard 118. The topic dashboard 118 may be displayed via a user interface associated with the contact center system 102, and may be used or accessed by a manager or other user associated with the contact center. For instance, a manager may use a computing device to access and view the topic dashboard 118, via a webpage, application, or other element associated with the contact center system 102.

Figure 2:
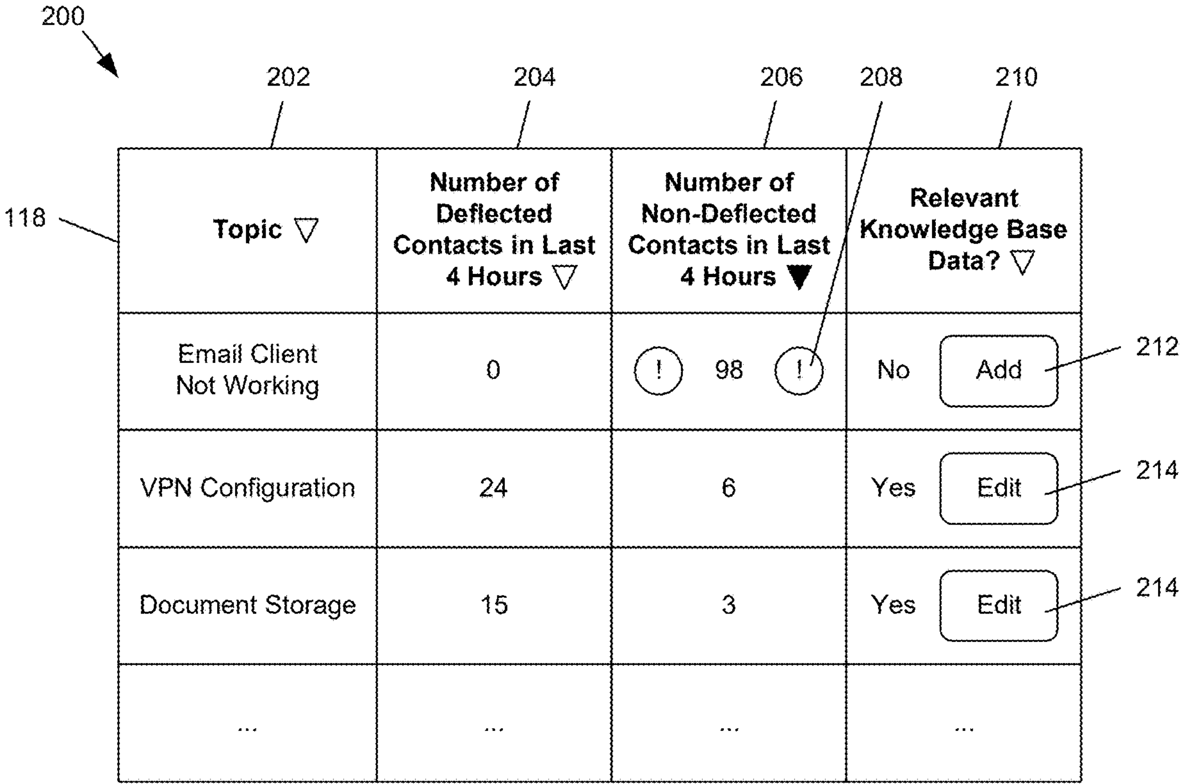
FIG. 2 shows an example of the topic dashboard that may be displayed by the contact center system.

The topic dashboard 118 may indicate metrics and/or other information associated with contacts 106 with the contact center that have been handed by the deflection bot 110 and/or representatives 104 over a period of time. The topic dashboard 118 may, for example, indicate identifiers of topics associated with contacts 106, for instance based on determinations of those topics by the topic determiner 116. The topic dashboard 118 may also indicate counts of individual contacts 106 associated with corresponding topics that were handled by deflection bot 110 and/or representatives 104 over a period of time. An example of the topic dashboard 118 is shown in FIG. 2, and is discussed further below with respect to that figure.

The topic dashboard 118 may indicate which topics of contacts 106 have been popular over particular periods of time, and/or how many contacts 106 associated with such popular topics were handled by representatives 104 and by the deflection bot 110. The topic dashboard 118 may also indicate when, or if, the number of contacts 106 associated with a particular topic has spiked over a period of time. As an example, if a technical issue with a company's IT infrastructure occurs at noon on a workday, the number of contacts 106 about that particular technical issue from employees of the company may spike and sharply increase during that afternoon. The topic dashboard 118 may accordingly display information that indicates the spike in the number of contacts 106 about that particular technical issue.

The number of contacts 106 associated with a particular topic may be considered to spike if the number of contacts 106 associated with the topic increases at a rate that exceeds a threshold rate, or exceeds a threshold number.

In some situations in which the number of contacts 106 associated with a topic spikes, the knowledge base 114 may already store information relevant to that topic. Accordingly, the deflection bot 110 may be able to automatically handle and resolve most or all of the contacts 106 associated with the topic based on the information stored in the knowledge base 114, such that the deflection bot 110 may deflect most or all of the contacts 106 associated with the topic away from being handled manually by representatives 104.

However, in other situations in which the number of contacts 106 associated with a topic spikes, the knowledge base 114 may not store information relevant to that topic. Accordingly, the deflection bot 110 may not be able to automatically handle and resolve contacts 106 associated with the topic based on information stored in the knowledge base 114, and the contacts 106 may be routed on to the representatives 104. In such situations, the amount of contacts 106 manually handled by representatives 104 may spike.

The topic dashboard 118 may, in some examples, indicate whether or not the knowledge base 114 stores information relevant to corresponding topics identified on the topic dashboard 118. The topic dashboard 118 may also, or alternately, have options or links to a knowledge base editor 120 that allows a user of the topic dashboard 118 to add information to the knowledge base 114 and/or edit information in the knowledge base 114 in association with the topics identified on the topic dashboard 118.

The topic dashboard 118 may be configured to indicate spikes in contacts 106, associated with topics that the deflection bot 110 is unable to resolve based on information in the knowledge base 114, in real-time or in near real-time. For instance, the topic dashboard 118 may indicate spikes in non-deflected contacts 106 over a current time period and/or a recent time period such as the last hour, the last four hours, the last day, the previous day, or any other time period.

Accordingly, if the topic dashboard 118 indicates that contacts 106 regarding a particular topic have been popular during a current or recent period of time, but that the deflection bot 110 has been unable to automatically resolve most or all of those contacts 106 based on information in the knowledge base 114, a user may use the knowledge base editor 120 to add new information associated with the topic to the knowledge base 114. By adding new information relevant to the topic to the knowledge base 114, the deflection bot 110 may subsequently be able to use the newly-added information in the knowledge base 114 to automatically resolve later contacts 106 that are associated with the topic. The deflection bot 110 may, for instance, be configured to substantially immediately begin to use the new information associated with the topic, added to the knowledge base 114 by a user in response to a spike in non-deflected contacts 106 associated with that topic, during contacts 106 associated with that topic such that the deflection bot 110 may have a greater likelihood of resolving those contacts 106 automatically.

As an example, if the contact center is associated with a company's IT department, and a configuration error occurs with a software application used by a company's employees, the employees may begin initiating contacts 106 with the contact center to ask how to fix the configuration error. If the configuration error is a new issue that has not occurred previously, the knowledge base 114 may not yet have any information indicating how to fix the configuration error. Accordingly, the deflection bot 110 may be unable to assist caller 108 with fixing the configuration error, and contacts 106 about the configuration error may be routed to representatives 104. The topic dashboard 118 may in turn begin to indicate that a number of contacts 106 about the configuration error has spiked over a recent period of time, and that most or all of the contacts 106 about the configuration error have been handled manually by representatives 104 instead of being handled automatically by the deflection bot 110.

In this example, a user of the topic dashboard 118 may determine that the number of manually-handled contacts 106 about the configuration error with the software application has spiked, and may use the knowledge base editor 120 to add a new article to the knowledge base 114 that explains how to fix the configuration error with the software application. After the new article is added to the knowledge base 114, the deflection bot 110 may begin using the new article in the knowledge base 114 to provide corresponding information, expressed in the new article, to callers 108. Accordingly, after the new article is added to the knowledge base 114, the deflection bot 110 may thereafter be able to automatically help callers 108 fix the configuration error with the software application, such that the number of subsequent contacts 106 about the configuration error that are handled manually by the representatives 104 may decrease.

In some situations, a new issue may arise that leads to a spike in contacts 106 that the deflection bot 110 is unable to resolve based on information in the knowledge base 114, and that representatives 104 are also unable to resolve due to the newness of the issue. In these situations, the topic dashboard 118 and/or other elements of the contact center system 102 may log those unresolved contacts 106 as well as contact information for the corresponding callers 108. When a way of resolving the issue is later found and corresponding new information about how to resolve the issue is added to the knowledge base 114, the deflection bot 110 may be configured to initiate new contacts 106 with the callers 108 associated with the previously-unresolved contacts 106 in order to provide the new information to those callers 108.

As an example, at a first time, a new type of technical problem may occur that representatives 104 have not yet been trained to address. At the first time, the knowledge base 114 may also not yet indicate how to solve the technical problem. Accordingly, when callers 108 initiate new contacts 106 with the contact center to inquire how to fix the technical problem, the deflection bot 110 may be unable to use information in the knowledge base 114 to resolve those contacts, and representatives 104 may also be unable to help the callers 108 with the technical problem. However, the contact center system 102 may log those contacts 106 as being unresolved. The deflection bot 110 and/or the representatives 104 may also inform the callers 108 that the technical problem is being investigated, and that the callers 108 will be informed how to fix the technical problem once a solution has been identified. At a second time, after a solution to the technical problem has been identified, a user of the knowledge base editor 120 may add corresponding information describing the solution to the knowledge base 114. Accordingly, after the second time, the deflection bot 110 may begin using the description of the solution, added to the knowledge base 114, to help callers 108 resolve the technical problem during subsequent contacts 106. The deflection bot 110 may also be configured to initiate new contacts 106, such as return calls, outgoing email messages, and/or other types of outgoing contacts 106, with the callers 108 that had contacted the contact center between the first time and the second time about the technical issue. Accordingly, after the second time, the deflection bot 110 may proactively provide those callers 108 with information about how to fix the technical issue, such that those callers 108 can be informed about the solution to the technical issue without the callers 108 having to initiate contacts 106 with the contact center again.

Overall, the topic dashboard 118 and/or other elements of the contact center system 102 may allow spikes in contacts 106 associated with particular topics, that the deflection bot 110 is unable to resolve due to a lack of relevant information in the knowledge base 114, to be identified more quickly than in previous systems. Elements of the contact center system 102, such as the topic dashboard 118 and/or the knowledge base editor 120, may also allow new information, associated with such topics, to be added to the knowledge base 114 more quickly than in previous systems, such that the deflection bot 110 may begin using the added information to automatically handle corresponding contacts 106 more quickly than in previous systems.

As an example, in some previous systems, identification of topics associated with contacts, numbers of contacts associated with particular topics that have been handled by representatives or a deflection bot, and/or other metrics associated with a contact center and contacts handled by the contact center may not be determined until weeks or months after the contacts occurred. Accordingly, it may not be apparent in such previous systems that there had been a spike in contacts about a particular topic, or that a deflection bot had been unable to handle the spike in such contacts, until an analysis is performed weeks or months later.

Moreover, in some previous systems, it may take weeks or months for a new knowledge base article associated with a topic to be written via separate systems or content generation pipelines, to be approved, and/or to be integrated into a knowledge base. Even if an increase in contacts associated with a topic is identified in such previous systems, it may take a relatively long time until a new knowledge base article about that topic is added to a knowledge base so that a deflection bot may access and use the new knowledge base article to automatically handle corresponding contacts. Accordingly, in such previous systems, representatives may continue manually handling contacts associated with the topic for weeks or months after the time the increase in contacts associated with the topic is noticed, and the time at which a new corresponding knowledge base article is added to the knowledge base.

Additionally, in situations in which there is an increase in contacts associated with a particular issue, that issue may be a temporary problem that is fixed within hours or days. Accordingly, even if a new knowledge base article about the problem is eventually added in previous systems, the problem may have already been fixed. As such, a period of time during which the new knowledge base article could have been used by a deflection bot to automatically handle contacts about the problem, and thereby avoid having representatives manually handle such contacts, may have already passed by the time the new knowledge base article is added in previous systems.

However, as described herein, the topic dashboard 118 may assist with real-time identification, and/or quicker identification, of a spike in contacts 106 associated with a topic that the deflection bot 110 is unable to deflect based on information in the knowledge base 114. Based on such information presented via the topic dashboard 118, a user may more quickly add new corresponding information about the topic to the knowledge base 114. Accordingly, the deflection bot 110 may more quickly begin to use the newly-added information in the knowledge base 114 to automatically handle subsequent contacts 106 associated with the topic, such that more contacts 106 associated with the topic can be deflected away from being handled manually by representatives 104.

Overall, the systems and processes described herein may reduce periods of time in which representatives 104 manually handle spikes in contacts 106 associated with topics, and thereby reduce usage of computing resources, improve metrics associated with the contact center, and/or otherwise increase the efficiency of the contact center. For example, if there is a spike in contacts 106 about a topic the deflection bot 110 is unable to resolve based on information in the knowledge base 114, processing cycles, memory, bandwidth, and/or other computing resources associated with the operations of the deflection bot 110 may be wasted as the deflection bot 110 communicates with callers 108 before determining that the deflection bot 110 is unable to assist the callers 108. Moreover, the spike in contacts 106 may lead to a larger volume of contacts 106 being routed to the representatives 104, thereby increasing usage of processing cycles, memory, bandwidth, and/or other computing resources associated with the contact router 112, computing systems used by the representatives 104 while the representatives 104 communicate with the callers 108, and/or other elements of the contact center system 102.

Additionally, a spike in contacts 106 associated with a topic the deflection bot 110 is unable to resolve based on information in the knowledge base 114 may increase the overall load on the representatives 104, and/or may increase hold times, contact resolution times, and/or other metrics associated with an overall amount of contacts 106 being handled by the contact center system 102. For instance, if the deflection bot 110 is unable to resolve contacts 106 associated with a particular topic because relevant information is not yet in the knowledge base 114, there may be a spike in the number of contacts 106 about that particular topic that are routed on to representatives 104. The representatives 104 may become busy with handling those contacts 106, such that hold times, overall contact times, and/or other metrics may increase. As an example, because the representatives 104 may become flooded with contacts 106 about a particular issue that the deflection bot 110 is not yet able to resolve, callers 108 who initiate contacts 106 about that particular issue and other issues may have to wait longer to be connected to a representative 104, and it may take longer for representatives 104 to assist callers 108 overall.

However, by identifying spikes in non-deflected contacts 106 about certain topics in real-time or near real-time via the topic dashboard 118, and by adding corresponding relevant information about those topics to the knowledge base 114 in response to identification of the spikes, the deflection bot 110 may begin using the added information in the knowledge base 114 to quickly begin handling subsequent contacts 106 about those topics automatically. Accordingly, fewer of the subsequent contacts 106 about those topics may be routed to representatives 104, which may in turn decrease overall hold times, decrease overall contact resolution times, decrease usage of computing resources associated with elements of the contact center system 102, and/or have other benefits relative to other systems. An example of a spike in non-deflected contacts 106 being identified via the topic dashboard 118 is shown in FIG. 2, and is described further below with respect to that figure.

FIG. 2 shows an example 200 of the topic dashboard 118 that may be displayed by the contact center system 102. The topic dashboard 118 may indicate metrics and other information about contacts 106 handled by the contact center over a period of time. For instance, the topic dashboard 118 may be configured to display information about contacts 106 handled by the contact center over the last day, the last four hours, the last hour, or any other period of time. In some examples, the topic dashboard 118 may be configured to display historical data associated with a previous period of time selected or defined by a user. However, as shown in FIG. 2, the topic dashboard 118 may also be configured to display data associated with a current or recent period of time, such as the most recent four hours. Accordingly, the topic dashboard 118 may display metrics and other information about contacts 106 that are currently being handled by the contact center and/or that have recently been handled by the contact center.

As discussed above, the topic determiner 116 may determine topics associated with individual contacts 106 handled by the contact center, including contacts 106 handled by the deflection bot 110 and contacts 106 handled by representatives 104. The topic dashboard 118 may accordingly indicate topics 202 associated with contacts 106 that have been handled over a period of time.

The topic dashboard 118 may also identify deflection counts 204 and/or non-deflection counts 206 of contacts 106 associated with corresponding topics 202 over the period of time. The deflection counts 204 may indicate how many contacts 106 associated with corresponding topics 202 were, over the period of time, fully resolved automatically by the deflection bot 110 based on information in the knowledge base 114. The non-deflection counts 206 may indicate how many contacts 106 associated with corresponding topics 202 were, over the period of time, not able to be resolved by the deflection bot 110 based on information in the knowledge base 114 and that were instead routed to representatives 104 to be handled manually.

In some examples, if the non-deflection count 206 associated with a particular topic 202 exceeds a threshold value, a rate of increase in the non-deflection count 206 exceeds a threshold rate, or the non-deflection count 206 exceeds the deflection count 204 by more than a threshold difference, there may be a spike in the number of contacts 106 about that topic 202 that the deflection bot 110 is unable to handle based on current information stored in the knowledge base 114. Accordingly, the contact center system 102 may be configured to use such metrics and/or comparisons to identify a spike in a number of non-deflected contacts 106 about a particular topic 202, and cause the topic dashboard 118 to present a visual and/or audible indication of the identified spike associated with the particular topic 202. For instance, the topic dashboard 118 may highlight the topic 202, may display a spike alert 208 in association with the non-deflection count 206 and/or the topic 202 overall, may adjust a font, color, and/or other visual presentation of the information about the topic 202 within the topic dashboard 118, and/or by otherwise identifying the spike associated with the topic 202.

In some examples, the topic dashboard 118 may also indicate knowledge base information 210 associated with the topics 202. The knowledge base information 210 may, for example, indicate whether the knowledge base 114 stores one or more articles or other content associated with the topics 202. If the knowledge base 114 does store content relevant to a topic 202, the knowledge base information 210 may in some examples include a link to that content, an article name or other identifier of the content, or any other information.

The topic dashboard 118 may also include one or more user-selectable options to add data to the knowledge base 114 and/or to edit data in the knowledge base 114. Such options may, if selected by a user of the topic dashboard 118, cause the knowledge base editor 120 to be opened such that the user may add data to the knowledge base 114 and/or edit existing data in the knowledge base 114.

For example, the topic dashboard 118 may include an add option 212 to add data to the knowledge base 114 and/or an edit option 214 to edit existing data in the knowledge base 114. In other examples, the topic dashboard 118 may have a single option that opens the knowledge base editor 120, such that a user may use the knowledge base editor 120 to add data to the knowledge base 114 and/or edit existing data in the knowledge base 114.

In some examples, user-selectable options such as the add option 212 and/or the edit option 214 may be displayed in association with individual topics 202. As an example, instances of the add option 212 and/or the edit option 214 may be displayed as or along with knowledge base information 210 associated with corresponding topics 202 as shown in FIG. 2, or otherwise in association with corresponding topics 202. In other examples, one or more user-selectable options to open the knowledge base editor 120 may be displayed elsewhere in a user interface that displays the topic dashboard 118, for instance as a single option to open the knowledge base editor 120 to add or edit information in the knowledge base 114 in association with any of the topics 202.

In some situations, a user of the dashboard may notice a spike alert 208 associated with a particular topic 202, or otherwise notice based on metrics shown in the topic dashboard 118 that there is or has been a spike in non-deflected contacts 106 associated with a particular topic 202. The user may use the add option 212, or another user-selectable option, to open the knowledge base editor 120 and add new data associated with the particular topic 202 to the knowledge base 114. By adding the new data about the particular topic 202 to the knowledge base 114, the deflection bot 110 may be reconfigured to use the new data in the knowledge base 114 about the particular topic 202 to handle subsequent contacts 106 associated with the particular topic 202. Accordingly, after the user adds the new data associated with the particular topic 202 to the knowledge base 114, the deflection count 204 associated with that particular topic 202 may increase over a subsequent period of time as the deflection bot 110 resolves corresponding contacts 106 about the particular topic 202 and fewer contacts 106 about the particular topic 202 are handled by representatives 104.

As an example, as shown in FIG. 2, an email client application used by employees of a company may stop working properly due to a technical issue. The knowledge base 114 may not initially have information indicating how to fix the technical issue with the email client, such that the deflection bot 110 is unable to resolve contacts 106 about the email client and there is a spike in the number of those contacts 106 handled manually by representatives 104. A user of the topic dashboard 118 may notice the spike in contacts 106 about the email client issue being handled manually by representatives 104, based on a spike alert 208 and/or metrics shown in the topic dashboard 118. The user may use the add option 212 to open the knowledge base editor 120, draft a new knowledge base article explaining how to fix the technical issue with the email client, and save the new knowledge base article in the knowledge base 114. After the knowledge base article explaining how to fix the technical issue with the email client has been added to the knowledge base 114, the deflection bot 110 may access the added knowledge base article when the deflection bot 110 handles future contacts 106 about the email client issue. Accordingly, the deflection bot 110 may have a higher likelihood of fully resolving those future contacts 106 about the email client issue automatically based on the added knowledge base article, thereby increasing the likelihood that such contacts 106 about the email client issue may be deflected away from representatives 104.

In some situations, a user of the topic dashboard 118 may evaluate a topic 202 associated with a spike in non-deflected contacts 106 to determine a complexity of the topic 202 and/or to determine whether the deflection bot 110 should be configured to handle contacts 106 about that topic 202. For instance, if the topic dashboard 118 indicates that there has been a spike in contacts 106 about a relatively simple issue that may be resolved relatively easily, a user of the topic dashboard 118 may choose to use the add option 212 to add an article to the knowledge base 114 indicating how to resolve the issue. The deflection bot 110 may thus use the added article during subsequent contacts 106 to automatically help callers 108 resolve the issue, such that the subsequent contacts 106 may be fully resolved via the deflection bot 110 and the contact center system 102 may avoid routing those subsequent contacts 106 on to representatives 104.

However, if the topic dashboard 118 indicates that there has been a spike in contacts 106 about a more complex issue, a user of the topic dashboard 118 may determine that it may be better for representatives 104 to manually help callers 108 resolve instances of that complex issue. For instance, in some examples a complex issue may arise that may only be resolved by representatives 104 taking actions on behalf of callers 108, or that may require different callers 108 to take different actions to resolve the issue. In these examples, a knowledge base article may not address the specifics of each caller's individual situation, and a user of the topic dashboard 118 may choose not to use the add option 212 to add such a knowledge base article to the knowledge base 114 so that contacts 106 about the issue continue to be routed to representatives 104.

Overall, the topic dashboard 118 may show spikes in non-deflection counts 206 associated with corresponding topics 202 over a period of time. For example, the topic dashboard 118 may show such spikes in real-time or near real-time, for instance over a current or recent period of time. A user may accordingly use the knowledge base editor 120 to add information to the knowledge base 114 that is relevant to a topic 202 that the topic dashboard 118 indicates is associated with a spike in a non-deflection count 206, for instance while the spike is still occurring or soon after the spike is identified. The deflection bot 110 may begin using new information added to the knowledge base 114 about the topic 202 immediately, or within a threshold amount of time, such that the deflection bot 110 may be more likely to resolve subsequent contacts 106 associated with the topic 202. Accordingly, when a spike in a non-deflection count 206 associated with a topic 202 is identified, and corresponding information is added to the knowledge base 114 in response to the spike, the deflection bot 110 may become configured to use the added information in the knowledge base 114 relatively soon after the spike occurs and/or is identified. Example methods involving the deflection bot 110 using information in the knowledge base 114 to automatically resolve contacts 106, and information being added to the knowledge base 114 in response to a spike in a non-deflection count 206 associated with a topic 202 identified via the topic dashboard 118, are discussed further below with respect to FIG. 3 and FIG. 4.

Figure 3:
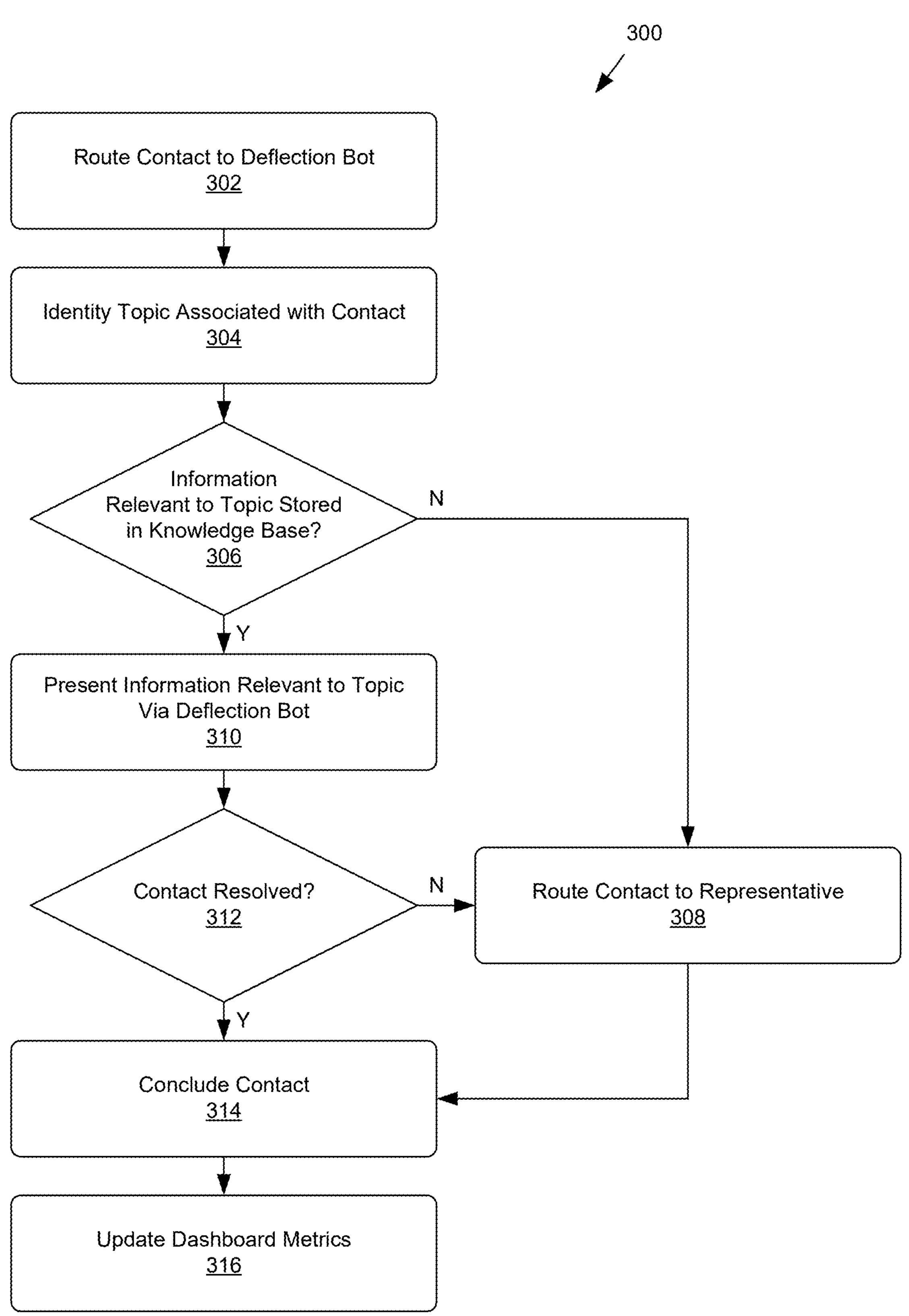
FIG. 3 shows a flowchart illustrating an example method for handling contacts via the contact center system.

FIG. 3 shows a flowchart illustrating an example method 300 for handling contacts 106 via the contact center system 102. The method 300 shown in FIG. 3 may be performed by a computing system that executes elements of the contact center system 102. An example system architecture for such a computing system is described below with respect to FIG. 5.

At block 302, the computing system may route a contact 106 to the deflection bot 110. For example, the contact router 112 of the contact center system 102 may identify a new incoming contact 106 from a caller 108 to the contact center, and may route the incoming contact 106 to the deflection bot 110. The deflection bot 110 may accordingly begin communicating with the caller 108 in association with the contact 106, for instance via NLP systems, predetermined scripts, dynamically-generated content, and/or other techniques.

At block 304, the computing system may identify a topic associated with the contact 106, for instance based on information provided by the caller 108 to the deflection bot 110. The deflection bot 110 may be configured to determine the topic of the contact 106 based on an analysis of input provided by the caller 108, such as the caller's answers to questions posed by the deflection bot 110. In some examples, communications between the caller 108 and the deflection bot 110 may also or alternately be provided to the topic determiner 116, such that the topic determiner 116 may analyze the communications to determine the topic of the contact 106.

At block 306, the computing system may determine whether information relevant to the topic of the contact 106 is stored in the knowledge base 114. For example, based on identification of the topic of the contact 106, and/or based on a question or other input provided by the caller 108 to the deflection bot 110, the deflection bot 110 may attempt to find corresponding relevant information in the knowledge base 114. Information relevant to the topic of the contact 106 may be information that has been stored in the knowledge base 114 for a relatively long period of time, or may be newer information that was added to the knowledge base 114 relatively recently in response to identification of a spike in a number of contacts 106 about the topic that the deflection bot 110 was previously unable to resolve.

If information relevant to the contact 106 is not stored in the knowledge base 114 (Block 306—No), the deflection bot 110 may be unable to resolve the contact 106, and the contact 106 may be routed to a representative 104 at block 308. For example, the contact router 112 may route the contact 106 from the deflection bot 110 to a representative 104.

However, if information relevant to the contact 106 is stored in the knowledge base 114 (Block 306—Yes), the deflection bot 110 may present that information to the caller 108 during the contact 106 at block 310. For example, the deflection bot 110 may provide the caller 108 with a link to the relevant information in the knowledge base 114, provide the caller 108 with a copy of the relevant information, provide the caller 108 with an excerpt of the relevant information, or provide the caller 108 with a dynamically-generated summary of the relevant information.

At block 312, the computing system may determine whether the deflection bot 110 has resolved the contact 106 by presenting the relevant information from the knowledge base 114 to the caller 108. For example, the deflection bot 110 may ask the caller 108 whether the provided information addressed the caller's issue, or whether the caller 108 would like to speak to a representative 104. As another example, the deflection bot 110 may be considered to have resolved the contact 106 if the caller 108 terminates the contact 106 after being presented with the information at block 310.

If the computing system determines that the deflection bot 110 has not resolved the contact 106 (Block 312—No), for instance if the caller 108 asks to speak to a representative 104, the contact 106 may be routed to a representative 104 at block 308. For example, as discussed above, the contact router 112 may route the contact 106 from the deflection bot 110 to a representative 104.

Once the contact 106 is resolved, for instance because the deflection bot 110 has resolved the contact 106 (Block 312—Yes) or the contact 106 was routed to a representative 104 at block 308 who then resolved the contact 106, the contact 106 may be concluded at block 314. The computing system may, at block 316, update dashboard metrics based on the handling of the contact 106.

The dashboard metrics updated at block 316 may be metrics that may be displayed via the topic dashboard 118. For example, the computing system may update or increment a deflection count 204 associated with the topic of the contact 106, identified at block 304, if the deflection bot 110 fully resolved the contact 106 and the contact 106 was not routed on to a representative 104. However, if the deflection bot 110 did not fully resolve the contact 106, and the contact 106 was routed on to a representative 104, the computing system may instead update or increment a non-deflection count 206 associated with the topic of the contact 106 that was identified at block 304.

The dashboard metrics, updated at block 316, may be displayed via the topic dashboard 118. In some examples, the dashboard metrics updated at block 316 and displayed via the topic dashboard 118 may indicate that there is currently, or has been, a spike in a non-deflection count 206 associated with a topic. A user of the topic dashboard 118 may accordingly identify the spike in the non-deflection count 206 associated with the topic, and use the knowledge base editor 120 to add information that is relevant to the topic to the knowledge base 114 such that the deflection bot 110 becomes able to use the added information to resolve subsequent contacts 106 about the topic.

Accordingly, if the computing system determines at block 306 that information relevant to a topic of a first contact 106 is not present in the knowledge base 114, the first contact 106 may be routed to a representative 104 at block 308 and thereby contribute to a spike in a non-deflection count 206 associated with that topic. However, if information relevant to the topic is thereafter added to the knowledge base 114, for instance in response to the spike in the non-deflection count 206 associated with the topic, and a second contact associated with the same topic is later received, the computing system may determine at block 306 that information relevant to the topic of the second contact 106 is now present in the knowledge base 114 such that the deflection bot 110 may be able to resolve the second contact 106 automatically at block 310 and block 312. An example method of identifying a spike in a non-deflection count 206 associated with a topic via the topic dashboard 118, and adding corresponding information to the knowledge base 114, is discussed further below with respect to FIG. 4.

Figure 4:
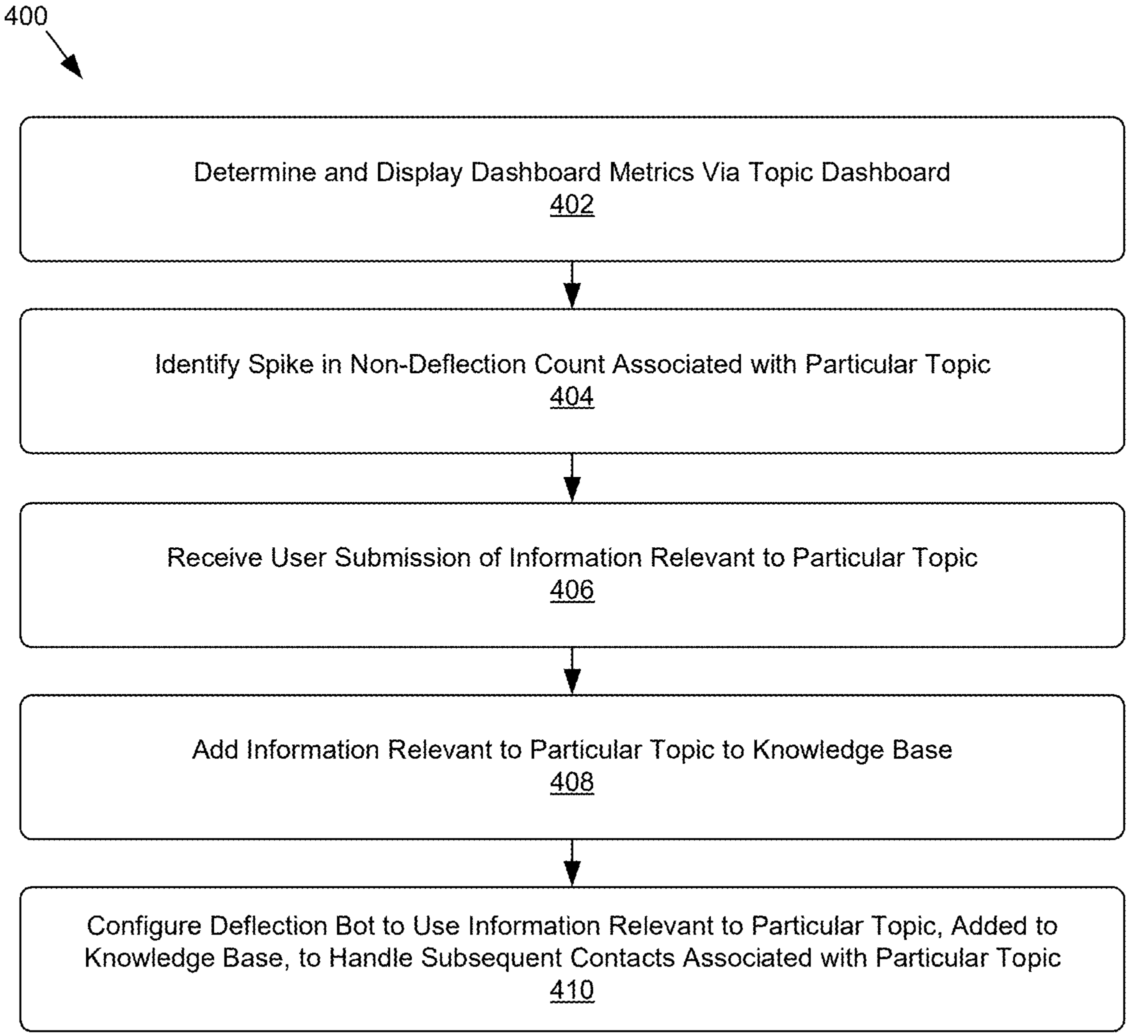
FIG. 4 shows a flowchart illustrating an example method for displaying the topic dashboard and updating the knowledge base via the contact center system.

FIG. 4 shows a flowchart illustrating an example method 400 for displaying the topic dashboard 118 and updating the knowledge base 114 via the contact center system 102. The method 400 shown in FIG. 4 may be performed by a computing system that executes elements of the contact center system 102. An example system architecture for such a computing system is described below with respect to FIG. 5.

At block 402, the computing system may determine dashboard metrics, and display the dashboard metrics via the topic dashboard 118. The topic dashboard 118 may be configured to display dashboard metrics associated with a particular period of time, such as a period of hours, days, weeks, or any other period of time. For example, the topic dashboard 118 may be configured to display dashboard metrics associated with a current or recent period of time, such as the last hour, the last two hours, or any other recent period of time.

The dashboard metrics may be associated with, and may be presented in the topic dashboard 118 in association with, corresponding topics 202 of contacts 106, for example as shown in FIG. 2. The dashboard metrics may include deflection counts 204 indicating how many contacts 106, associated with corresponding topics 202, were automatically resolved by the deflection bot 110 and were thereby deflected away from representatives 104 during the particular time period for which the topic dashboard 118 is configured to display dashboard metrics. The dashboard metrics may also, or alternately, include non-deflection counts 206 indicating how many contacts 106, associated with corresponding topics 202, were not resolved or deflected by the deflection bot 110 and were instead routed to representatives 104 during the particular time period for which the topic dashboard 118 is configured to display dashboard metrics.

At block 404, the computing system may identify, via the topic dashboard 118, a spike in a non-deflection count 206 associated with a particular topic. In some examples, the topic dashboard 118 may display the deflection count 204 and the non-deflection count 206 associated with the topic, and a user may determine that the displayed non-deflection count 206, relative to the displayed deflection count 204, indicates a spike in the non-deflection count 206 associated with the topic. The computer system may also, or alternately, be configured to automatically identify the spike, for instance by determining that the non-deflection count 206 exceeds a threshold number, by determining that the non-deflection count 206 has been increasing at more than a threshold rate, by determining that the non-deflection count 206 exceeds the deflection count 204 by at least a threshold difference, and/or by other spike detection techniques. In examples in which the computer system automatically identifies the spike in the non-deflection count associated with the topic, the computing system may cause the topic dashboard 118 to display a spike alert 208 in association with the topic and/or the non-deflection count 206 as shown in FIG. 2.

At block 406, the computing system may receive a user submission of information relevant to the particular topic associated with the spike in the non-deflection count 206 identified at block 404. For example, in response to the spike in the non-deflection count 206 associated with the particular topic being identified via the topic dashboard 118 at block 404, a user may use an add option 212 or other link to the knowledge base editor 120 presented via the topic dashboard 118 to open the knowledge base editor 120. The user may use the knowledge base editor 120 to enter new information relevant to the particular topic, such as by adding or editing content of a knowledge base article. The computing system may add the user-submitted information received at block 406 to the knowledge base 114 at block 408.

At block 410, the computing system may accordingly configure the deflection bot 110 to use the user-submitted information relevant to the particular topic, added to the knowledge base 114 at block 408, to handle subsequent contacts 106 associated with the particular topic. In some examples, the deflection bot 110 may be configured to access and use any information stored in the knowledge base 114 when handling contacts 106, such the deflection bot 110 may be configured to use any new information added to the knowledge base 114 substantially immediately after the information is added to the knowledge base 114. In other examples, the deflection bot 110 may be re-trained or otherwise reconfigured to use the information added to the knowledge base 114. As an example, if the deflection bot 110 is based on a generative AI system that may dynamically generate content to present to callers 108 based on information in the knowledge base 114, the deflection bot 110 may begin using new information to dynamically generate corresponding content substantially immediately after the new information is added to the knowledge base 114, and/or the generative AI system may be retrained based at least in part on new information within a threshold period to time after the new information is added to the knowledge base 114.

Accordingly, after user-submitted information is added to the knowledge base 114 at block 408 and the deflection bot 110 is configured to use the added information at block 410, the deflection bot 110 may begin using the added information to handle subsequent contacts 106 associated with the particular topic, and may thus have a higher likelihood of fully resolving those subsequent contacts 106 and deflecting the subsequent contacts 106 away from representatives 104. By reconfiguring the deflection bot 110 to use new information added to the knowledge base 114 that is relevant to a topic, fewer contacts 106 associated with that topic may be subsequently routed to representatives, thereby reducing the load on representatives 104, reducing overall hold times and contact resolution times, reducing usage of computing resources associated with the contact center system 102, and/or leading to other technical benefits.

Figure 5:
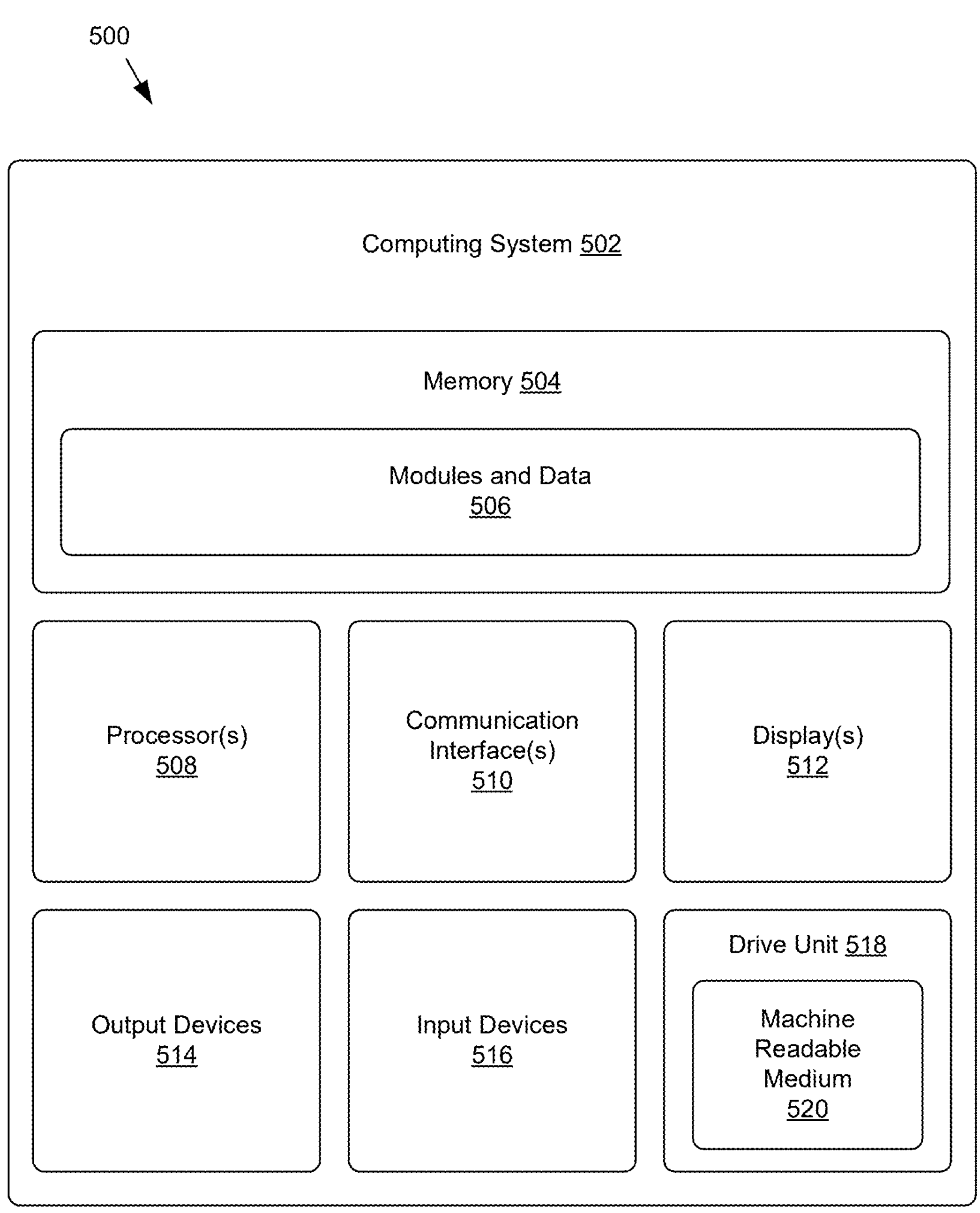
FIG. 5 shows an example system architecture for a computing system that may execute one or more elements of the contact center system.

FIG. 5 shows an example system architecture 500 for a computing system 502 that may execute one or more elements of the contact center system 102 and/or other elements associated with the contact center system 102, such as the deflection bot 110, the contact router 112, the knowledge base 114, the topic determiner 116, the topic dashboard 118, the knowledge base editor 120, and/or other elements described herein. The computing system 502 may include one or more computers, servers, or other types of computing devices. Individual computing devices of the computing system 502 may have the system architecture 500 shown in FIG. 5, or a similar system architecture.

In some examples, elements associated with the contact center system 102 may be distributed among, and/or be executed by, multiple computing systems or devices similar to the computing system 502 shown in FIG. 5. As an example, the deflection bot 110 may be executed by a different computing system than a computing system that causes display of the topic dashboard 118. As another example, the topic determiner 116 may be executed by a different computing system than one or more computing systems that execute other elements of the contact center system 102. The computing system 502 may, in some examples, include or be part of a cloud computing environment or other distributed system that hosts and/or executes one or more elements associated with the contact center system 102.

The computing system 502 may include memory 504. In various examples, the memory 504 may include system memory, which may be volatile (such as RAM), non-volatile (such as ROM, flash memory, etc.) or some combination of the two. The memory 504 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which may be used to store desired information and which may be accessed by the computing system 502. Any such non-transitory computer-readable media may be part of the computing system 502.

The memory 504 may store modules and data 506, including software or firmware elements, such as data and/or computer-readable instructions that are executable by one or more processors 508. For example, the memory 504 may store computer-executable instructions and data associated with the contact center system 102, such as data associated with the deflection bot 110, the contact router 112, the knowledge base 114, the topic determiner 116, the topic dashboard 118, the knowledge base editor 120, and/or other elements described herein. The modules and data 506 stored in the memory 504 may also include any other modules and/or data that may be utilized by the computing system 502 to perform or enable performing any action taken by the computing system 502. Such modules and data 506 may include a platform, operating system, and applications, and data utilized by the platform, operating system, and applications.

The computing system 502 may also have processor(s) 508, communication interfaces 510, a display 512, output devices 514, input devices 516, and/or a drive unit 518 including a machine readable medium 520.

In various examples, the processor(s) 508 may be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which may be associated with types of volatile (RAM) and/or nonvolatile (ROM) memory.

The communication interfaces 510 may include transceivers, modems, network interfaces, antennas, and/or other components that may transmit and/or receive data over networks or other connections. In some examples, the communication interfaces 510 may be used to exchange data between elements described herein, such as data communications between the deflection bot 110 and the knowledge base 114, between the knowledge base editor 120 and the knowledge base 114, and/or other types of data communications.

The display 512 may be a liquid crystal display, or any other type of display commonly used in computing devices. In some examples, the topic dashboard 118 may be displayed via the display 512. The output devices 514 may include any sort of output devices known in the art, such as the display 512, speakers, a vibrating mechanism, and/or a tactile feedback mechanism. Output devices 514 may also include ports for one or more peripheral devices, such as headphones, peripheral speakers, and/or a peripheral display.

The input devices 516 may include any sort of input devices known in the art. For example, input devices 516 may include a microphone, a keyboard/keypad, and/or a touch-sensitive display, such as a touch-sensitive display screen. A keyboard/keypad may be a push button numeric dialing pad, a multi-key keyboard, or one or more other types of keys or buttons, and may also include a joystick-like controller, designated navigation buttons, or any other type of input mechanism.

The machine readable medium 520 may store one or more sets of instructions, such as software or firmware, that embodies any one or more of the methodologies or functions described herein. The instructions may also reside, completely or at least partially, within the memory 504, processor(s) 508, and/or communication interface(s) 510 during execution thereof by the computing system 502. The memory 504 and the processor(s) 508 also may constitute machine readable media 520.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:

identifying, by a computing system comprising a processor, contacts associated with a topic, wherein a deflection bot is configured to automatically handle at least an initial portion of the contacts;

determining, by the computing system, a non-deflection count indicating a number of the contacts, over a period of time, that the deflection bot was unable to resolve based on a knowledge base and that were routed from the deflection bot to representatives;

causing, by the computing system, display of a user interface indicating a spike in the non-deflection count over the period of time;

receiving, by the computing system, and in response to the spike in the non-deflection count indicated by the user interface, new information associated with the topic; and configuring, by the computing system, the deflection bot to handle subsequent contacts associated with the topic by adding the new information to the knowledge base.

2. The computer-implemented method of claim 1, wherein the deflection bot is a chatbot configured to communicate with callers, during the contacts, based on the knowledge base.

3. The computer-implemented method of claim 2, wherein:

the deflection bot is based on a generative pre-trained transformer (GPT) model, and the deflection bot is trained to generate output, presented by the deflection bot to the callers, based on the knowledge base.

4. The computer-implemented method of claim 1, wherein:

the user interface is a dashboard configured to display deflection counts and non-deflection counts associated with a plurality of topics in association with the period of time, and the deflection counts indicate how many of the contacts associated with the plurality of topics were successfully resolved automatically by the deflection bot based on the knowledge base.

5. The computer-implemented method of claim 1, wherein the period of time is a current or recent period of time.

6. The computer-implemented method of claim 1, further comprising:

identifying, by the computing system, the spike in the non-deflection count over the period of time; and causing, by the computing system, display of a spike alert via the user interface in association with the topic.

7. The computer-implemented method of claim 6, wherein the computing system identifies the spike in the non-deflection count based on identifying at least one of:

the non-deflection count exceeding a threshold value, a rate of increase of the non-deflection count exceeding a threshold rate, or the non-deflection count exceeds a deflection count, indicating a second number of the contacts successfully resolved by the deflection bot automatically based on the knowledge base, by more than a threshold difference.

8. The computer-implemented method of claim 1, wherein the user interface displays a user-selectable option associated with a knowledge base editor, and the method further comprises:

executing, by the computing system, and in response to a user selection of the user-selectable option, the knowledge base editor;

receiving, by the computing system, the new information associated with the topic as user input provided via the knowledge base editor; and adding, by the computing system, and based on the user input, the new information associated with the topic to the knowledge base.

9. A computing system, comprising:

one or more processors, and memory storing computer-executable instructions associated with a contact center system that, when executed by the one or more processors, cause the one or more processors to:

determine a non-deflection count indicating a number of contacts, between callers and a contact center, that are associated with a topic and that over a period of time have been handled by representatives of the contact center instead of being resolved automatically by a deflection bot based on a knowledge base;

cause display of a dashboard indicating a spike in the non-deflection count over the period of time;

receive, based on the spike in the non-deflection count, user input defining information associated with the topic; and configure the deflection bot to handle subsequent contacts associated with the topic by adding the information associated with the topic, defined by the user input, to the knowledge base.

10. The computing system of claim 9, wherein the deflection bot is a chatbot configured to communicate with the callers, during the contacts, based on the knowledge base.

11. The computing system of claim 9, wherein the computer-executable instructions further cause the one or more processors to:

determine a deflection count indicating a second number of the contacts associated with the topic that, over the period of time, have been automatically resolved by the deflection bot based on the knowledge base; and cause the dashboard to display the deflection count and the non-deflection count associated with the topic.

12. The computing system of claim 11, wherein the computer-executable instructions further cause the one or more processors to identify the spike in the non-deflection count over the period of time by identifying at least one of:

the non-deflection count exceeding a threshold value, a rate of increase of the non-deflection count exceeding a threshold rate, or the non-deflection count exceeds the deflection count by more than a threshold difference.

13. The computing system of claim 12, wherein the computer-executable instructions further cause the one or more processors to display a spike alert, via the dashboard, in association with the topic based on identification of the spike.

14. The computing system of claim 9, wherein the dashboard displays a user-selectable option associated with a knowledge base editor, and the computer-executable instructions further cause the one or more processors to:

execute, in response to a user selection of the user-selectable option, the knowledge base editor;

receive the user input defining the information associated with the topic via the knowledge base editor; and add, based on the user input, the information associated with the topic to the knowledge base.

15. One or more non-transitory computer-readable media storing computer-executable instructions associated with a contact center system that, when executed by one or more processors of a computing system, cause the one or more processors to:

determine a non-deflection count indicating a number of contacts, between callers and a contact center, that are associated with a topic and that over a period of time have been handled by representatives of the contact center instead of being automatically resolved by a deflection bot based on a knowledge base;

cause display of a dashboard indicating a spike in the non-deflection count over the period of time;

receive, based on the spike in the non-deflection count, user input defining information associated with the topic; and configure the deflection bot to handle subsequent contacts associated with the topic by adding the information associated with the topic, defined by the user input, to the knowledge base.

16. The one or more non-transitory computer-readable media of claim 15, wherein the deflection bot is a chatbot configured to communicate with the callers, during the contacts, based on the knowledge base.

17. The one or more non-transitory computer-readable media of claim 15, wherein the computer-executable instructions further cause the one or more processors to:

determine a deflection count indicating a second number of the contacts associated with the topic that, over the period of time, have been automatically resolved by the deflection bot based on the knowledge base; and cause the dashboard to display the deflection count and the non-deflection count associated with the topic.

18. The one or more non-transitory computer-readable media of claim 17, wherein the computer-executable instructions further cause the one or more processors to identify the spike in the non-deflection count over the period of time by identifying at least one of:

the non-deflection count exceeding a threshold value, a rate of increase of the non-deflection count exceeding a threshold rate, or the non-deflection count exceeds the deflection count by more than a threshold difference.

19. The one or more non-transitory computer-readable media of claim 18, wherein the computer-executable instructions further cause the one or more processors to display a spike alert, via the dashboard, in association with the topic based on identification of the spike.

20. The one or more non-transitory computer-readable media of claim 15, wherein the dashboard displays a user-selectable option associated with a knowledge base editor, and the computer-executable instructions further cause the one or more processors to:

execute, in response to a user selection of the user-selectable option, the knowledge base editor;

receive the user input defining the information associated with the topic via the knowledge base editor; and add, based on the user input, the information associated with the topic to the knowledge base.

* * * * *